United States Patent
Litman et al.

[15] 3,698,776
[45] Oct. 17, 1972

[54] CENTER THRUST RETAINER FOR SPHERICAL RACE BALL BEARINGS

[72] Inventors: Bernard Litman, Wantagh; Everett R. Silvia, both of Huntington Station, N.Y.

[73] Assignee: Ambac Industries, Inc., Garden City, N.J.

[22] Filed: Nov. 15, 1971

[21] Appl. No.: 198,570

[52] U.S. Cl. .................................. 308/35, 74/5 R
[51] Int. Cl. ........................ F16c 31/06, G01c 19/16
[58] Field of Search ............ 74/5; 308/35 X, 174, 194

[56] References Cited

UNITED STATES PATENTS

| | | |
|---|---|---|
| 2,704,695 | 3/1955 | Ricefield ................. 308/194 |
| 2,971,770 | 2/1961 | Wagner ................. 308/194 X |
| 2,919,963 | 1/1960 | Mims ....................... 308/174 |
| 3,126,231 | 3/1964 | Herr ........................... 308/35 |
| 3,082,629 | 3/1963 | Jones, Jr. et al. ............ 74/5 X |

*Primary Examiner*—Manuel A. Antonakas
*Attorney*—Dexter N. Shaw et al.

[57] ABSTRACT

A spherical bearing assembly for gyroscopes and the like including means for minimizing the frictional effects of acceleration loads on the ball retainer. Said means includes a structural support arrangement for the retainer whereby the retainer is supported during acceleration at the center of the bearing. A cavity within the inner race extending to a point comprising the center of the bearing is adapted to receive an axial stem portion of the retainer. A tip portion of the retainer stem is adapted to seat against a spherical surface within the inner race located substantially at the bearing center. This arrangement reduces gyro precession by minimizing the frictional moments about the roll, yaw and pitch axes.

8 Claims, 5 Drawing Figures

PATENTED OCT 17 1972

3,698,776

CENTER THRUST RETAINER FOR SPHERICAL RACE BALL BEARINGS

BACKGROUND OF INVENTION

A gyroscope is classically considered to be a spinning mass or rotor supported in such a manner that the spin axis of the rotor can turn freely and without restraint at least about one axis perpendicular to the spin axis, and generally about either or both of two mutually orthogonal axes each perpendicular to the spin axis.

It has been common practice in the prior art to provide such non-restraining support for the spinning rotor by means of a low-friction spin bearing which supports the gyro rotor for rotation about its spin axis, and by means of a gimbal structure for supporting the spin bearing. For example, the spin bearing structure may itself be pivotably supported on an inner gimbal to permit tilting of the spin axis about a first axis orthogonal to the spin axis, and the inner gimbal may be supported in turn on an outer gimbal having suitable bearings permitting rotation of the inner gimbal with respect to the outer gimbal about a second axis orthogonal to the first axis and to the spin axis.

More recently there has been developed a type of gyro rotor support in which the spin axis bearing and the gimbal bearings permitting rotation of the spin axis about two other mutually orthogonal axes are combined into a single spherical-race ball bearing assembly. This has been accomplished by affixing the gyro rotor to an outer race having an inner spherical bearing surface, and supporting the outer race on an inner spherical support concentric with the outer spherical surface by means of balls which contact the outer spherical surface of the inner support and the inner spherical surface of the outer race in rolling relation thereto. A ball retainer is also provided to fix the relative positions or spacings of the balls with respect to each other. In this type of bearing, the support arrangement not only permits the rotor to be spun at a high rate about its spin axis, but also permits free rotation of the spin axis about the other two mutually orthogonal axes.

When the gyro rotor support is to be subjected to substantial accelerative forces transverse to the plane of spin of the gyro rotor, there is a tendency for the ball retainer to be forced against an inner surface of the outer race structure due to inertial forces. Such accelerative forces may become quite large, for example in applications in which the gyroscope is utilized for the guidance of a missile or space vehicle or the like, which is rapidly accelerated during takeoff.

It is known in the prior art to provide a thrust retainer arrangement for accommodating such forces, in the form of a thrust retaining bearing surface provided near the periphery of the retainer and adapted to engage a corresponding bearing surface affixed to the outer race, thereby to provide the desired thrust-retaining action. However, it has been found that the above-mentioned substantial accelerative forces produce frictional restraint against spinning of the gyro rotor which are substantially greater than would be expected merely from a consideration of the inertial forces involved. The frictional forces under such conditions in fact become so large as to produce an undesirable drag on the spinning of the gyro rotor, resulting in a slowing of the rate of spin during linear acceleration of the rotor support. Particularly in missile guidance systems where the gyro rotor is rotationally accelerated at launch and then allowed to "coast" after launching, such deceleration forces due to friction may in fact slow down the rotor sufficiently to alter its gyroscopic properties. This additional restraint is believed to be caused by an effect known as "ball-twist effect". Regardless of the exact cause, it has been found that a spherical bearing of the above-described type having conventionally disposed and constructed thrust retaining bearing surfaces produces undesirably large frictional restraining forces about the spin axis when the gyroscope is accelerated translationally in a direction transverse to the spin plane.

In a co-pending application assigned with the present application to a common assignee, said co-pending application being entitled "Thrust Retainer for Spherical Race Ball Bearings" filed on Aug. 12, 1971, and assigned Ser. No. 171,203, a retainer arrangement was disclosed wherein the inertial forces of the ball and retainer as well as ball twist forces were transmitted from the retainer to the outer race at the axis of rotation of the outer race to minimize friction moments about the roll axis. That invention, however, did not provide means for minimizing the friction moments about the yaw and pitch axis which could contribute significantly to gyro drift.

It is accordingly a first object of the present invention to provide a new and useful bearing structure.

A further object of the invention is to provide such a new bearing structure which provides support for a spinning mass with reduced frictional restraints on such spinning.

An additional object is to provide such a new bearing structure which also permit substantially free variation in the direction of the spin axis of the rotating mass.

Another object is to provide a new and useful form of gyroscope.

A further object is to provide an improved form of spherical support bearing for a gyroscope rotor.

Another object is to provide an improved spherical support bearing for a gyroscope rotor within which frictional restraint about the roll, yaw and pitch axes produced in response to acceleration forces are substantially reduced.

Additional objects and advantages of the invention will become readily apparent from a detailed description of embodiments of the invention as set forth below.

SUMMARY OF THE INVENTION

In accordance with the invention, there is provided a spherical bearing assembly, suitable for example to support a gyroscope rotor, which includes an inner race having a spherical surface connected to a stationary support means and an outer race having an inner spherical surface rotatably disposed about the inner race by means of rows of ball bearings retained in the proper spaced alignment by means of a retainer having a plurality of spaced holes within which the balls are held captive. The present invention provides means for minimizing the frictional restraint on rotation of the outer race about the inner race caused during acceleration of the assembly attributable to the various forces including inertial and ball-twist forces acting on the balls and the retainer.

The invention in brief includes an arrangement wherein the retainer is supported during acceleration substantially at the center of the bearing. In a preferred embodiment, a spherical bearing surface concentric with the inner and outer race spherical surfaces is located within the inner race. An inwardly extending stem portion of the retainer is adapted for cooperative seating on the bearing surface within the inner race. By this arrangement, any acceleration forces applied to the unit transverse to the plane of rotation of the gyro rotor and which produce resultant inertial or ball-twist forces of the balls and retainer will be transmitted at or closely adjacent the center of the gyro rotor bearing, at which point such forces acting on a relatively short moment arm will produce minimal effects on the rotating gyro rotor. Such effects will be minimized due to the location of the bearing surfaces not only on the roll axis of the gyro, but also on the pitch and yaw axes as well.

DESCRIPTION OF THE PREFERRED EMBODIMENT

Figure 1:
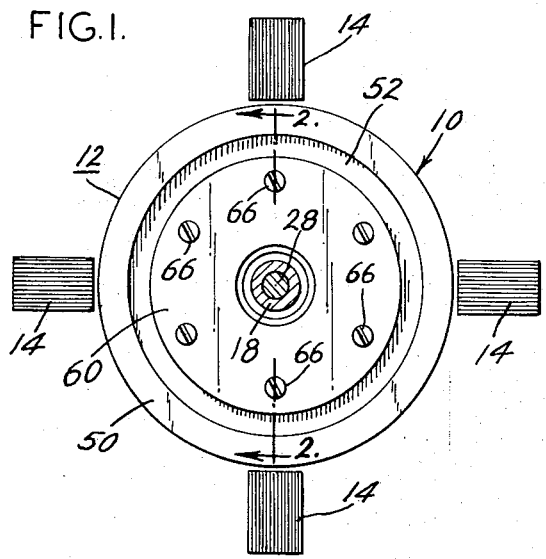
FIG. 1 is a partly schematic and elevational view of a gyroscope rotor and bearing assembly incorporating the improvement of the present invention.

Referring to the drawings, FIG. 1 shows in partly schematic form a gyroscope assembly generally designated 10, the rotor 12 of which is rotatably supported on a spherical bearing assembly in accordance with the present invention. Coils 14 spaced at 90° intervals around the circumference of the rotor are electromagnetic pick-off devices which provide an electrical signal proportional to the annular position of the rotor about two axes orthogonal to the spin axis. The rotor is driven up to speed by a retractable drive shaft with a forked end that engages holes in the rotor (not shown).

Figure 2:
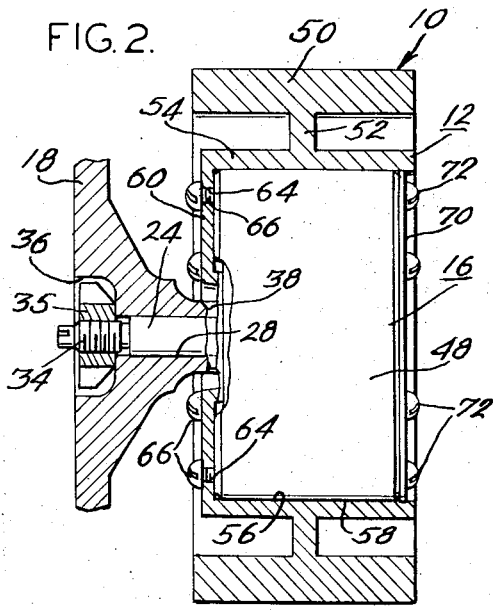
FIG. 2 is an enlarged sectional view taken along lines 2—2 of FIG. 1.
Figure 3:
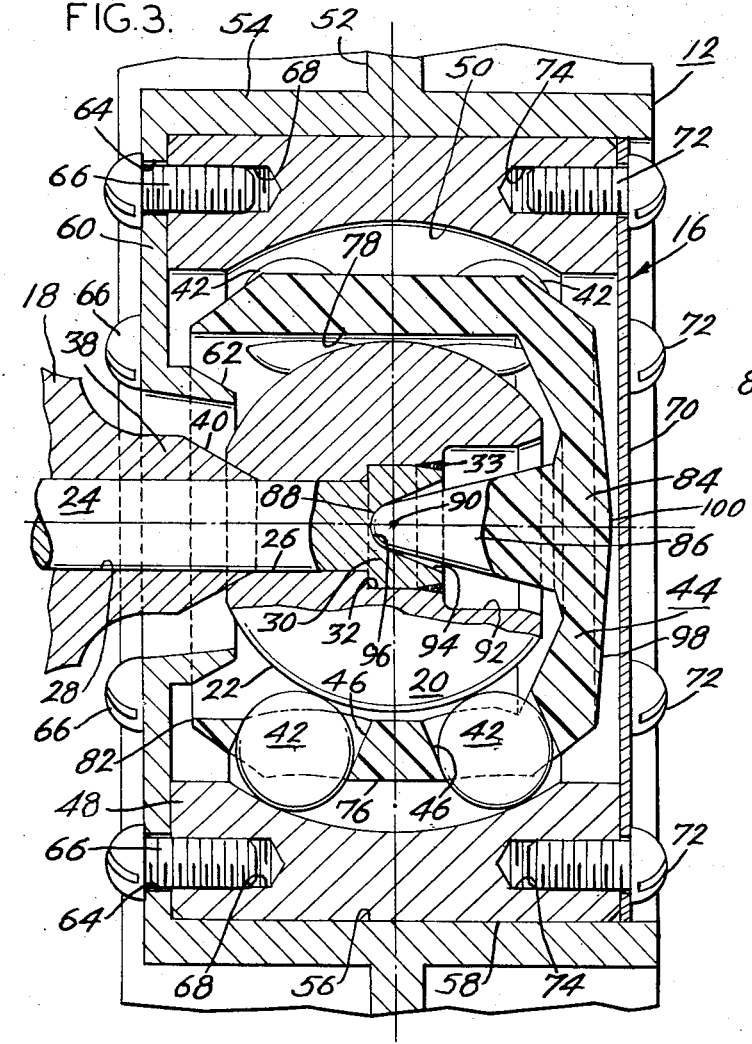
FIG. 3 is a greatly enlarged sectional view of the bearing portion of FIG. 2 showing details of the central bearing support arrangement for the retainer.

Referring to FIGS. 2 and 3, the details of the spherical bearing assembly generally designated 16 are illustrated. The rotor and bearing assembly are carried by a support means 18, the bearing assembly permitting the spinning of the rotor 12 in a preselected inertial plane not effected (within limits) but by changes in attitude of the support means. Should the gyroscope be mounted on a vehicle such as a missile for guidance purposes, the support means 18 would normally be secured to or comprise a part of the vehicle.

As As shown in FIG. 3, the bearing assembly 16 includes an inner race 20 having a spherical outer surface 22. The inner race is secured to the support means 18 by a bearing support rod 24 passing through a diametric bore 26 in the inner race and a bore 28 in the support means 18. The enlarged head 30 of the rod 24 is seated within a counterbore 32 in the inner race and is welded to the inner race at 33. The opposite end of the rod is threaded at 34 as shown in FIG. 2 to accommodate a nut 35 housed within a cavity 36 of the support means 18. A neck portion 38 of the support means 18 extends coaxially with the support rod, the tip 40 thereof defining a conical face cooperating with a similar conical seat in the inner race. The tightening of the nut 35 accordingly secures the inner race 20 to the support means 18 in a manner which permits a maximum utilization of the spherical bearing surface 22.

A plurality of bearing balls 42 are arranged on the spherical surface 22 in two parallel annular rows by a retainer 44 which includes a plurality of equally spaced ball holes 46 to maintain the alignment and equal spacing of the ball bearings in each row while permitting rolling movement of the balls. The construction of the retainer and particularly its manner of central support within the inner race at substantially the center of the gyro rotor bearing are thoroughly described herebelow.

An outer bearing race 48 includes a spherical inner surface 50 of a diameter chosen to provide rolling contact with the balls 42 extending through the holes 46 in the retainer, the balls 42 serving to position the outer race 48 concentrically with respect to the inner race 20 for any attitude of the rotor with respect to the support means. The rotor 12 is characterized by a relatively thick outer flange 50 connected by radial web portion 52 to an inner flange portion 54. The rotor is mounted on the outer race 48 with the inner cylindrical surface 56 thereof engaging the outer cylindrical surface 58 of the outer race 48. A radially inwardly extending portion 60 of the rotor along one side thereof terminates in a neck portion 62 adjacent the inner race 20. Holes 64 in the portion 60 of the rotor permit passage of screws 66 therethrough which are threadedly engaged in the threaded bores 68 of the outer race to secure the rotor in position on the outer race. A cover plate 70 on the opposite side of the outer race from the rotor portion 60, is secured in position by screws 72 received within the threaded bores 74 of the outer race.

The details of the spherical bearing assembly described thus far are conventional as will be apparent from a consideration of the prior art illustrated and described in the co-pending application Ser. No. 171,203, referred to above. In the prior art devices, spherical surfaces of the retainer were adapted to engage the outer race spherical surface particularly during acceleration with the resultant transfer of inertial and ball twist forces to the outer race. In the invention of the referenced co-pending application, one or both of the retainer spherical surfaces were eliminated and the thrust forces were transmitted to a thrust plate secured to the outer race substantially along the axis of rotation of the outer race to minimize the moment arm of the frictional forces. Although such an arrangement would be effective to minimize such friction forces at least with respect to the roll axis of the gyro, there would be no diminution of the frictional effects considered with respect to the yaw and pitch axes. The present invention is an improvement on the invention of the co-pending application and effectively minimizes the frictional effects produced by the retainer with respect to the yaw and pitch axes as well as the roll axis.

Figure 4:
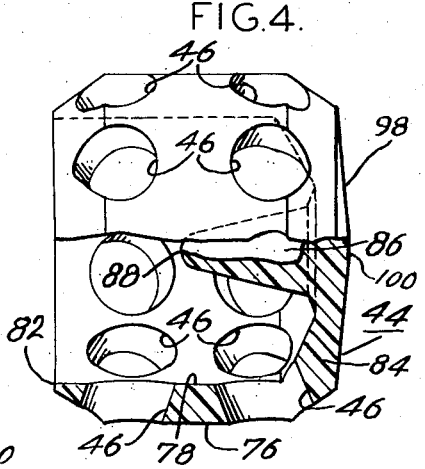
FIG. 4 is a side elevational view partly broken away and in section of a retainer of the type employed in the present invention.
Figure 5:
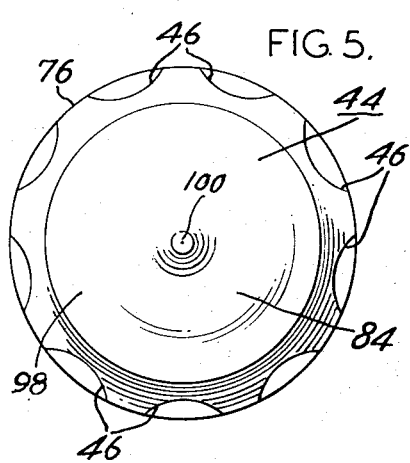
FIG. 5 is an end elevational view of the retainer shown in FIG. 4 looking toward the closed end thereof.

The retainer 44, as shown in FIGS. 3, 4 and 5, is characterized by a cylindrical outer surface 76 and a coaxial inner cylindrical surface 78, the latter surface having a diameter slightly larger than the diameter of the inner race 20. The surfaces 76 and 78 are interrupted by the ball holes 46 as illustrated which serve to position the balls 42 inserted therewithin in spaced aligned disposition. The end 82 of the retainer adjacent the support means 18 is open to accommodate the support means and the rotor neck portion 62 while the opposite end 84 is closed and includes the novel retainer support means which minimizes the frictional effects of the retainer.

The retainer support means includes an inwardly directed stem portion 86 of the retainer which extends axially inwardly and terminates in a spherical tip portion 88 centered on the center 90 of the spherical inner and outer race bearing surfaces. The inner race 20 includes a cavity 92 adapted to receive the stem portion 86 of the retainer, the cavity 92 being sized to permit the normal movement of the retainer with respect to the inner race without interference. A conical bore 94 in the head 30 of support rod 24 terminates inwardly in a spherical bearing surface 96 also centered on the bearing center 90 and adapted to cooperatively receive the spherical surface 88 of the stem portion 86 of the retainer. The conical bore 94 in the support rod 24 is of a sufficient size so as to avoid restraint of the stem portion 86 during normal movement of the retainer with respect to the inner race 20. The retainer in addition to its normal rotation in the plane of the gyro rotor rotation, is thus free to rotate within limits about the gyro pitch and yaw axes. The mutually perpendicular roll, pitch and yaw axes are shown in FIG. 3, the roll axis being the horizontal axis, passing through the support rod 24, the yaw axis being the vertical axis passing through the bearing center, and the pitch axis being mutually perpendicular to the other two and passing through their intersection at the bearing center.

In operation, the present bearing assembly operates in a substantially conventional manner to provide a rotation of the rotor 10 about the support means 18. The outer race 48 to which the rotor is attached rotates on the balls 42 about the fixed inner race 20. In view of the spherical inner and outer race surfaces upon which the ball bearings ride, the angular relationship between the support means 18 and the outer race 48 may change within limits without disturbing the inertial plane of rotation of the rotor. The retainer 44 serves is conventional purpose of maintaining the balls in the proper spacing in parallel rows and rotates with the balls around the inner race. The bearing of the spherical tip 88 of the stem portion 86 of the retainer against the complementary spherical bearing surface 96 of the support rod 24 serves to center the retainer between the spherical surfaces of the inner and outer races.

The support of the retainer substantially at the bearing center is of particular significance when the forces acting on the retainer during acceleration of the gyro are considered. The frictional forces developed by acceleration transverse to the plane of rotation of the rotor have been found to be much greater than can be attributable to the inertial resultant forces of the retainer and balls alone. The substantial additional force is believed to be largely due to a phenomenon termed "ball twist loading". Considered briefly, ball twist is deemed to result from a small forward shift of the ball/race contact due to the inelasticity of the material of the balls and races. This deviation from ideal kinematics causes the balls to exert an axial force against the retainer which varies with axial race load, the inelasticity of the ball and race materials, and the coefficient of friction in the ball/race contact area.

Where both radial rows of balls are equally loaded, the axial ball twist force is equal and opposite on the retainer with a zero net force. An external loading, such as an acceleration transverse to the plane of rotation of the outer race, unbalances the loads on the ball rows, resulting in a net axial force on the retainer. Unless the bearing is designed to efficiently support this load, the ball twist force can cause a major increase in overall bearing friction torque.

Considering the effects of acceleration transverse to the plane of rotation of the rotor in the present gyro structure and assuming acceleration of the assembly to be directed to the right as viewed in FIGS. 2 and 3, it can be understood that the resultant inertial force of the retainer will be essentially to the left or against the support rod 24, being transmitted thereto by means of the spherical tip 88 of the stem portion 86 of the retainer. With respect to the roll axis of the gyro which passes through the support rod 24, it can be understood that the frictional forces of acceleration which would tend to slow the rotation of the retainer are minimal in view of the bearing surface of the retainer being essentially on the roll axis, thus providing virtually no moment arm for the axial friction forces. Since the retainer bearing surfaces are located centrally with respect to the yaw and pitch axes as well, there would similarly be a minimal moment arm through which acceleration frictional forces in other directions could act to restrict the free positioning of the retainer and hence through the motion of the balls, the outer race and gyro rotor. The maximum moment arm through which these frictional forces may act can be seen to be the radius of the spherical surface 88. By holding this radius as small as practicable (a few hundredths of an inch), the effect of the frictional forces on retainer movement and hence on the gyro drift will be minimal.

Although the tip 88 of the stem portion 86 of the retainer is in the preferred embodiment a spherical bearing surface, this surface may have a shape other than spherical, preferably a curved surface of revolution which will cooperate with the spherical bearing surface 96 to permit a low friction movement of the retainer with respect to the inner race.

It will be apparent that under some circumstances, such as the acceleration of the gyro to the left as viewed in FIGS. 2 and 3, the retainer is free to move translationally with respect to the inner race to the right toward and possibly into engagement with the place 70. To accommodate such movement, the end face 98 of the retainer facing the plate 70 is formed in a relatively flat conical configuration, the apex 100 of which is preferably of a spherical shape to provide sliding engagement with the plate 70. Contact of the retainer with the plate 70 at the apex 100 of the retainer surface 98 will minimize frictional problems at least with respect to the roll axis at which such contact would substantially be centered in a manner similar to that described in the above-identified co-pending application. However, to take full advantage of the present retainer supporting arrangement, the gyro should be oriented during periods of substantial acceleration, so that the inertial and ball twist effects are directed to the left as viewed in FIG. 3, thereby maintaining the retainer stem in engagement with the spherical surface 96 within the inner race.

Manifestly, changes in details of construction can be effected by those skilled in the art without departing from the spirit and the scope of the invention.

We claim

1. In a spherical bearing assembly including an inner race having a spherical exterior bearing surface, an outer race having an inner spherical bearing surface concentric with and spaced from the bearing surface of said inner race, a plurality of ball bearings disposed between said inner and outer races in rolling bearing relation to the respective spherical surfaces thereof, and a ball retainer between said spherical surfaces adapted positioned to maintain said ball bearings in a predetermined relatively spaced disposition, the improvement comprising thrust-retaining means for minimizing the frictional moments derived from acceleration effects on the retainer and balls, said thrust-retaining means comprising a spherical bearing surface disposed within said inner race and concentric with said inner and outer race spherical surfaces, and means extending from said retainer having a bearing surface thereon adapted to cooperatively engage said spherical bearing surface within said inner race to rotationally support said retainer substantially at the center of said bearing assembly.

2. In a spherical bearing assembly including an inner race having a spherical exterior bearing surface, an outer race having an inner spherical bearing surface concentric with and spaced from the bearing surface of said inner race, a plurality of ball bearings disposed between said inner and outer races in rolling bearing relation to the respective spherical surfaces thereof, and a ball retainer between said spherical surfaces having an axis of rotation substantially coaxial with the axis of rotation of said outer race, said ball retainer being positioned to maintain said ball bearings in a pair of spaced parallel annular rows perpendicular to the retainer axis with the bearings in each row being maintained in a predetermined relatively spaced disposition, the improvement comprising thrust retaining means for minimizing the frictional moments derived from acceleration effects on the retainer and balls, said thrust retaining means comprising a spherical bearing surface disposed within said inner race and concentric with said inner and outer race spherical surfaces, and means extending from said retainer having a bearing surface thereon adapted to cooperatively engage said spherical bearing surface within said inner race to rotationally support said retainer substantially at the center of said bearing assembly.

3. The invention as claimed in claim 2 wherein said means extending from said retainer comprises a stem portion of said retainer coaxial with the axis of rotation of said retainer, and wherein said bearing surface thereon comprises a spherical surface.

4. The invention as claimed in claim 3 wherein said retainer has a substantially cylindrical configuration coaxial with the axis of revolution of said outer race, said retainer being open at one end and closed on the other end, said stem portion extending coaxially from said closed end.

5. The invention as claimed in claim 4 wherein said closed end of said retainer includes an outer face opposed from said stem portion, and means on said outer race adapted to cooperate with said retainer outer face to position said retainer under certain operating conditions.

6. The invention as claimed in claim 5 wherein said retainer outer face comprises a conical surface having a substantially spherical apex portion, the center of said spherical apex portion lying on the retainer axis.

7. The invention as claimed in claim 5 wherein said means on said outer race adapted to cooperate with said retainer outer face comprises a planar plate member disposed perpendicularly to the spin axis of said outer race.

8. The invention as claimed in claim 5 wherein the stem portion of said retainer is characterized by a substantially conical configuration.

* * * * *

UNITED STATES PATENT OFFICE
CERTIFICATE OF CORRECTION

Patent No. 3,698,776          Dated October 17, 1972

Inventor(s) Bernard Litman and Everett R. Silvia

It is certified that error appears in the above-identified patent and that said Letters Patent are hereby corrected as shown below:

Column 7, line 18, delete "adapted".

Signed and sealed this 29th day of May 1973.

(SEAL)
Attest:

EDWARD M. FLETCHER, JR.         ROBERT GOTTSCHALK
Attesting Officer               Commissioner of Patents